US006661739B1

(12) United States Patent
Benjamin et al.

(10) Patent No.: US 6,661,739 B1
(45) Date of Patent: Dec. 9, 2003

(54) FILIGREE ELECTRODE PATTERN APPARATUS FOR STEERING PARAMETRIC MODE ACOUSTIC BEAMS

(75) Inventors: Kim C. Benjamin, Portsmouth, RI (US); Steve E. Forsthe, Portsmouth, RI (US); William L. Konrad, Niantic, CT (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/161,993

(22) Filed: May 31, 2002

(51) Int. Cl.[7] .................................... G01S 15/00
(52) U.S. Cl. .................................... 367/92
(58) Field of Search .................................... 367/92

(56) References Cited

U.S. PATENT DOCUMENTS 3,882,444 A * 5/1975 Robertson .................... 367/92
4,190,818 A * 2/1980 Follin et al. .................. 367/92
6,108,275 A * 8/2000 Hughes et al. .............. 367/164

OTHER PUBLICATIONS

Kim, Filigree Electrode Pattern Apparatus for Steering Parametric Mode Acoustic Beams, May 31, 2002, Abstract.*

* cited by examiner

*Primary Examiner*—Daniel T. Pihulic
(74) *Attorney, Agent, or Firm*—James M. Kasischke; Michael F. Oglo; Jean-Paul A. Nasser

(57) ABSTRACT

A piezoelectric embedded monolithic active surface for transmitting a directed acoustic beam comprising a monolithic active surface, a plurality of piezoelectric elements embedded on the surface forming an array comprising, a plurality of coupled frequency pairs comprising, a first primary frequency row extending in a frequency steered direction the first primary frequency row enabled to accept a first primary frequency signal, and a second primary frequency row extending in the frequency steered direction and located adjacent to the first primary frequency row the second primary frequency row enabled to accept a second primary frequency signal, wherein the plurality of coupled frequency pairs repeat in a delay-steered direction and wherein each of the coupled frequency pairs are enabled to accept a time delayed copy of the first and second primary frequency signals.

9 Claims, 3 Drawing Sheets

FILIGREE ELECTRODE PATTERN APPARATUS FOR STEERING PARAMETRIC MODE ACOUSTIC BEAMS

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

Not applicable.

BACKGROUND OF THE INVENTION (1) Field of the Invention

The present invention relates to a transducer for steering parametric mode acoustic beams. More specifically, the present invention relates to an apparatus comprised of a plurality of elements apodized from a conductive material and arranged over a piezoelectric continuum surface to direct an acoustic beam at a desired frequency and steering angle.

(2) Description of Prior Art

It is practiced in the art to dispose four electrically phased signals (0, 90, 180, 270 degrees) through an array of piezoelectric elements over a piezoelectric continuum surface to direct an acoustic beam at a desired frequency and steering angle such as described in U.S. Pat. No. 6,108,275 to Hughes et al. This conventional, or non-parametric, configuration operates in the linear mode. In a linear mode, changing the frequency results in a change to the steering angle.

In general, if an array contains N-by-N elements, the number of independent control points required for broadband beam steering equally in two dimensions is $N^2$. As used herein, "beam steering" refers to directing acoustic energy from a moving surface in a desired direction, usually by varying the amplitude and phase of the individual parts of the surface in a systematic manner over the surface. Beam "steering angle" is the angle at which acoustic energy is directed relative to the face of the transducer. Because the number of control points increases as the square of piezoelectric elements in any of two orthogonal directions comprising the array, the complexities of fabrication and control of the array similarly increase with the addition of elements. Because conventional, linear mode, low frequency sources require very large radiating apertures to form directional acoustic beams, they often require a large number of elements and the attendant cost and complexity that goes with them.

What is therefore needed is an apparatus for directing an acoustic beam comprised of piezoelectric elements that has a relatively small radiating aperture, can be easily and affordably fabricated, and which requires few control points to operate an array of piezoelectric elements.

SUMMARY OF THE INVENTION

Accordingly, it is an object of the present invention to provide a transducer apparatus for steering wideband parametric mode acoustic beams.

In accordance with the present invention, a piezoelectric embedded monolithic active surface for transmitting a directed acoustic beam comprises a monolithic active surface, a plurality of piezoelectric elements formed on said surface by the apodization of a continuous conductor forming an array of electrodes comprising, a plurality of coupled frequency pairs comprising, a first primary frequency row extending in a frequency steered direction the first primary frequency row comprising means for accepting a first primary frequency signal, and a second primary frequency row extending in the frequency steered direction and located adjacent to the first primary frequency row the second primary frequency row comprising means for accepting a second primary frequency signal, wherein the plurality of coupled frequency pairs repeat in a delay-steered direction and wherein each of the coupled frequency pairs comprises a means for accepting a time delayed copy of the first and second primary frequency signals.

DESCRIPTION OF THE PREFERRED EMBODIMENT

In contrast to the linear case described above, where changing the frequency must result in the change of steering angle, steering of the acoustic beam along one axis is achieved in the present invention by varying the frequencies of the two primary drive signals independently. This allows the parametric mode difference frequency to be varied while maintaining a fixed arbitrary pointing angle. As used herein, "parametric model" refers to a technique for generating an acoustic signal with low frequency by the nonlinear interaction over a finite region of two high-intensity, high-frequency signals, or primary frequency signals. The frequency of the low-frequency signal is equal to the difference of the primary frequency signals. This difference is commonly referred to as the "difference frequency". The use and advantage of parametric mode is that the beam width of the difference frequency signal can be made small using a device that is physically small. This allows the difference frequency to vary while retaining a constant beam angle, therefore enabling broadband signals like FM chirps to be conveyed with a narrow beamwidth while retaining control of the steering angle.

As used herein, "beam width" refers to a measure of the narrowness of an acoustic beam. Usually expressed in degrees, indicating how many degrees wide the cone of greatest intensity is. Narrow beam width is in general desirable since it means that available acoustic energy is focused in one direction, rather than dissipated in all directions (e.g., a flashlight vs. a simple bulb with the same wattage).

In addition, the present invention teaches beam steering in two orthogonal directions, allowing a full two-dimensional raster scanning capability. This is done by combining the filigree apodization-based steering in one direction described more fully below with conventional time delay beam steering in the orthogonal direction. The total complexity of drive electronics is no more than that required to steer in one direction with the addition of conventional time delay techniques.

In this way, broadband signals like FM, or phase coded, chirps may be generated over a broad range of difference frequencies and directed to bearing angles of interest. As used herein, "FM chirps" refer to sonar signals that start at a low frequency and increases in frequency at later time. Bird sounds are often chirps with varying frequency, hence the name.

Figure 1:
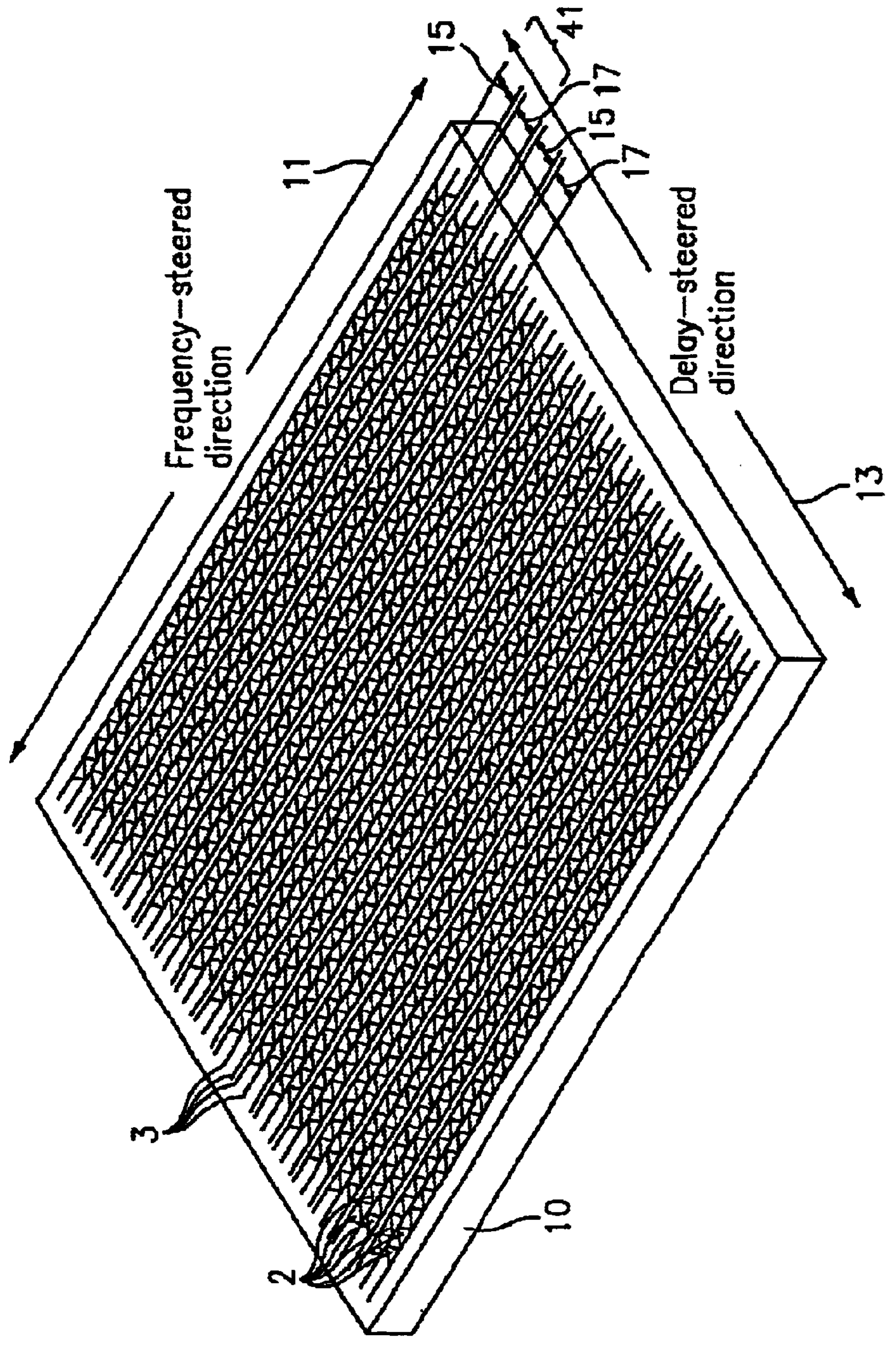
FIG. 1 A perspective view of the monolithic active surface of the present invention.

The enabling mechanism of the subject invention is an intricate electrode pattern, or filigree, that is illustrated in FIG. 1. The electrode pattern forms an array of piezoelectric elements 2 connected as described more fully below by connecting wires 3. The piezoelectric elements 2 are mounted on the surface of a monolithic active surface 1. In a preferred embodiment, monolithic active surface 1 is fabricated from a 1–3 piezoelectric composite panel. The use of 1–3 piezoelectric composite material possesses an inherently high thickness mode coupling relative to lateral mode coupling. "Thickness mode", and "lateral mode" refer to the ways in which a thin plate of piezoelectric material responds to a driving voltage. Thickness mode is the vibration in the direction perpendicular to the plate. This is desirable, since it causes sound to be radiated into the surrounding water. Lateral mode is the vibration along the surface of the plate and is undesirable since it does not reliably radiate sound, but instead causes unpredictable motion (and resonances) of the plate.

In addition, due to its availability in large sheets, 1–3 piezoelectric composite material provides a cost effective means of obtaining a continuous and homogeneous active layer several wavelengths in aperture. However, the present invention is broadly drawn to any active surface 1, including, but not limited to, Polyvinylidene Fluoride (PVDF) sheets.

The piezoelectric elements described more fully below, are arranged upon monolithic active surface 1 with reference to two orthogonal axes oriented in a frequency steered direction 11 and a delay steered direction 13.

Piezoelectric elements are generally arranged to form a plurality of coupled frequency pairs of primary frequency rows 15,17 extending in frequency steered direction 11 and replicated in delay steered direction 13. Each first primary frequency row 15 is immediately adjacent to its corresponding second primary frequency row 17 forming a coupled frequency pair 41. In addition, a plurality of coupled frequency pairs 41 are repeated in the delay steered direction 13 each pair adjacent to at least one other.

Figure 3:
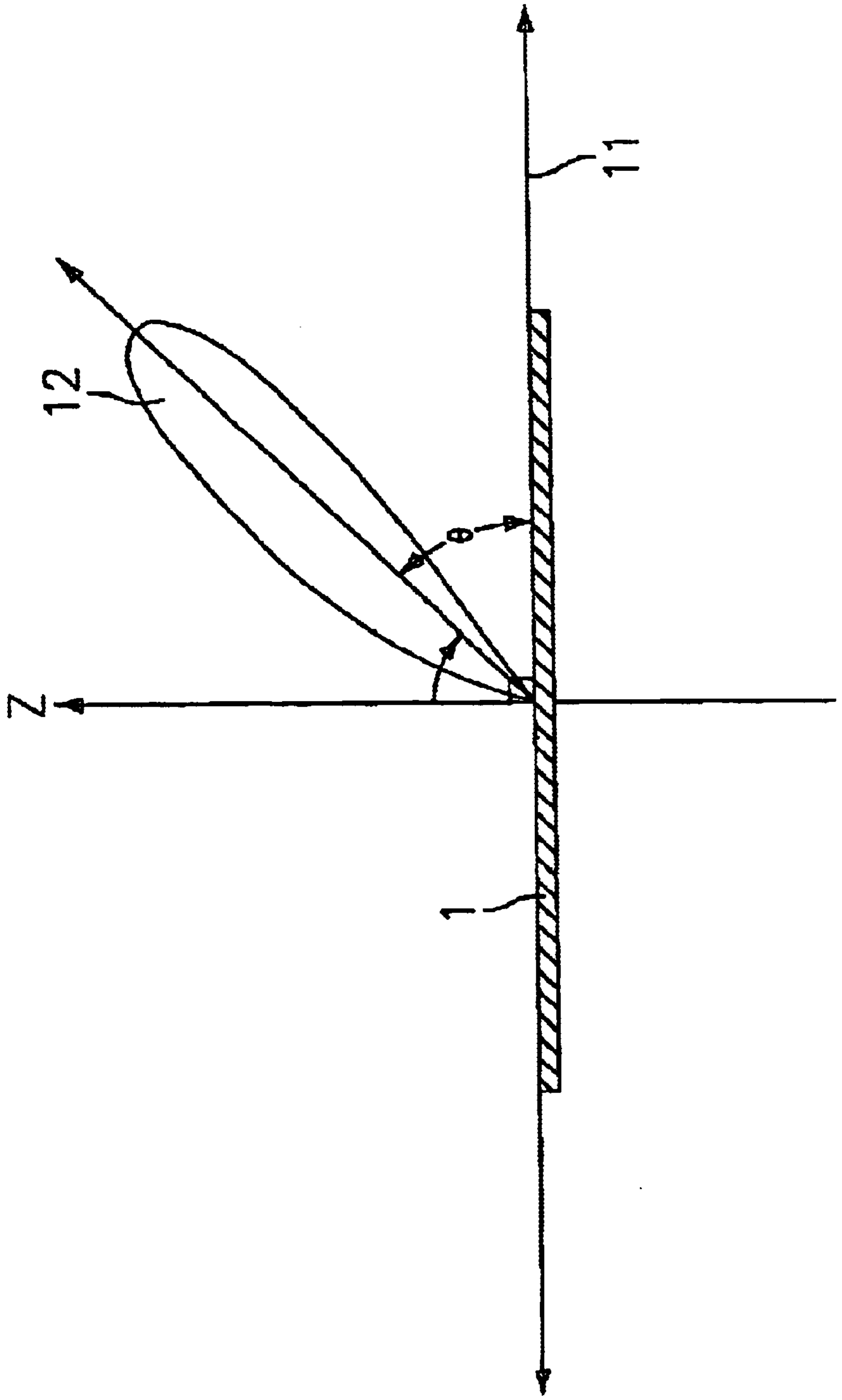
FIG. 3 A diagram of a parametric mode transducer and directed acoustic beam of the present invention.

With reference to FIG. 3, there is illustrated a diagram of the monolithic active surface 1 shown in cross section perpendicular to delay steered direction 13. As illustrated, the transducer comprised of monolithic active surface 1 emits an acoustic beam 12 at angle theta relative to the surface of the monolithic active surface 1.

Figure 2:
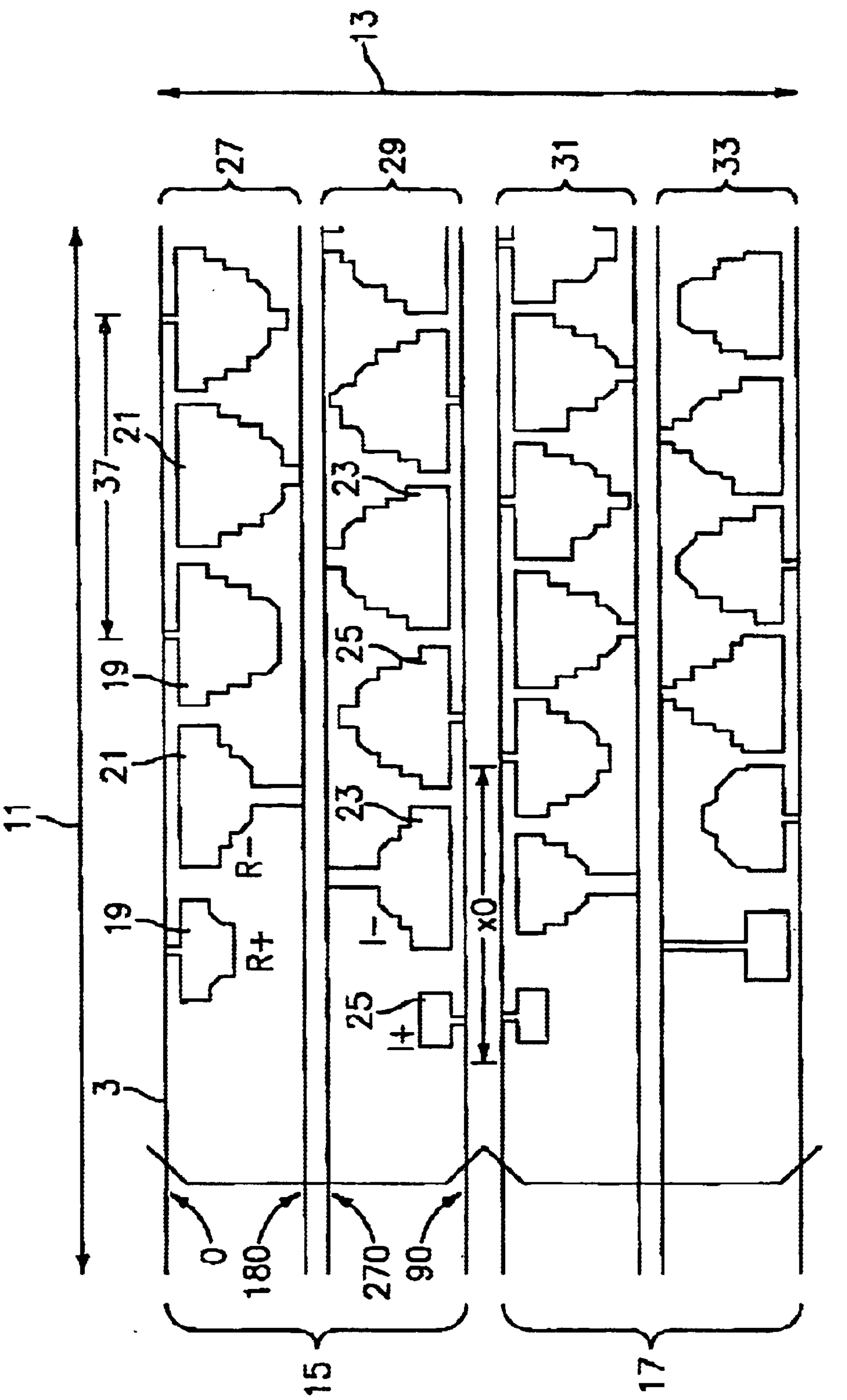
FIG. 2 A diagram of the filigree pattern of the present invention.

With reference to FIG. 2 there is illustrated in detail the arrangement of the piezoelectric elements forming both first primary frequency row 15 and second primary frequency row 17. The precise location of each piezoelectric element in each primary frequency row 15,17 is defined as described more fully below by choosing a common steering angle theta and a primary frequency for each primary frequency row 15,17. Once the steering angle theta and a primary frequency is selected, one can compute the required spacing for the piezoelectric components comprising each primary frequency row 15,17. As a result, each primary frequency row 15,17 differs from the other in only two ways. First, each primary frequency row 15,17 receives as an input a different primary frequency signal and, second, the spacing of the piezoelectric elements forming each primary frequency row 15,17 differs. Therefore, while there is herein described the layout of first primary frequency row 15, the same methodology by which first primary frequency row 15 is constructed is applied to construct second primary frequency row 17.

Primary frequency row 15 is divided into two rows: real frequency row 27 and imaginary frequency row 29. Real frequency row 27 is comprised of alternating R+ piezoelectric elements 19 and R− piezoelectric elements 21. All of the R+ piezoelectric elements 19 are connected by the same wire 3 so as to receive a first primary frequency signal. Likewise, all of the R− piezoelectric elements 21 are connected by the same wire 3 so as to receive a first primary frequency 180° shifted signal comprised of the first primary frequency signal shifted by 180°.

Similarly, imaginary frequency row 29 is comprised of alternating I+ piezoelectric elements 25 and I− piezoelectric elements 23. All of the I+ piezoelectric elements 19 are connected by the same wire 3 so as to receive a first primary frequency 90° shifted signal comprised of the first primary frequency signal shifted by 90°. Likewise, all of the I− piezoelectric elements 23 are connected by the same wire 3 so as to receive a first primary frequency 270° shifted signal comprised of the first primary frequency signal shifted by 270°.

Note that the shape of each repeating piezoelectric element forms a quadrant of a sinusoidal wave function. The configuration of each piezoelectric element according to such a shape gives rise to the following property. Consider an arbitrary slice 4 drawn to span a single primary frequency row 15 and located an arbitrary distance x0 from the left edge of primary frequency row 15. A portion of slice 4 extends through the area formed from a R− piezoelectric elements 21 as well as the area formed from an I+ piezoelectric element 23. As illustrated, the portion of slice 4 extending through I+ piezoelectric element 23 is shorter in length than the portion of slice 4 extending through R− piezoelectric element 21. As x0 is increased and slice 4 moves across first primary frequency row 15, the proportions of slice 4 extending through R− piezoelectric elements 21, R+ piezoelectric elements 19, I+ piezoelectric elements 25, and I− piezoelectric elements 23 continually change.

Specifically, the proportions of the active regions comprised of the piezoelectric elements 19,21,23, and 25 along the frequency steered direction 11 intersecting a slice 4 moved in frequency steered direction 11, are proportional to the positive and negative real and imaginary parts of the complex surface velocity required to steer each primary beam in the x direction as described more fully below. Real and imaginary parts refer to the standard mathematical description of the relative amplitudes of and phases of sinusoids. By convention, cos(theta) corresponds to a real part=1 and imaginary part 0, sin(theta) has real part 0, imaginary part 1, etc.

As illustrated in FIG. 2, multiple copies of the electrode patterns forming primary frequency rows 15,17 are laid down in the delay-steered direction 13 forming coupled frequency pairs 41. Each copy of primary frequency rows 15,17 is configured to receive the primary frequency signals corresponding to the inputs to each of original primary frequency rows 15,17 delayed by a predetermined time delay. The time delay may be implemented using any means of delaying an electronic signal including, but not limited to, analog delay lines, digital delay lines, and Charge Coupled Delay-lines CCDs. As, a result, the primary acoustic beam signals created by the activation of the monolithic active surface 1 by inputting a first and second primary frequency signal as well as time delayed versions of the first and second primary frequency signals can be steered in two orthogonal directions. The directions of the two primary beams (and thus of the parametric difference beam) are controlled by simultaneously altering the frequencies of the primary frequency signals, and inducing a time delay across the electrodes in the delay-steered direction 13.

There is now described in more detail the derivation of the electrode pattern of piezoelectric elements. First, there is chosen a first primary frequency, $f_1$, and corresponding beam direction, theta, to be generated by the monolithic active surface 1. Next, there is calculated the (one dimensional) velocity distribution over the surface required to generated the desired beam. This can be accomplished by specifying the far field beam pattern desired and performing an inverse Fast Fourier Transform (FFT) to generate the required distribution. As used herein, "far field beam pattern" refers to the distribution of acoustic energy at a large distance away from the acoustic source that produces it. Normally it refers to how focused the acoustic energy is in one direction.

Next, a separation distance 37 is computed for each primary frequency row. Separation distance 37 is the distance required between each similar piezoelectric element 19,21,23,25 located in real or imaginary frequency row 27,29. For example, note that in FIG. 2 separation distance 37 is the distance between each R+ piezoelectric element 19.

As discussed above, the separation distance 37 is computed from the desired primary frequency f, and steering angle theta. First, Given a desired frequency F and steering angle q, compute F sin q. This has the dimensions of frequency and the corresponding wavelength on the surface is 1=c/(F sin q). By making a repeating electrode pattern on the surface with this wavelength, any other frequency $f_1$ will steer to a different angle theta according to F sin q=$f_1$ sin(theta)

As an example, for a primary of F=240 kHz and a desired steer angle of 30 degrees, F sin q=240K (0.5)=120K. Since the speed of sound in water is about 60000 inches/sec, 1=60000/120000=0.5 inches. This is the repeat pattern required of the corresponding electrode for this frequency and steer angle.

Generate a pattern on the surface of the active material that represents the desired complex surface velocity at any offset x0 along the frequency-steered direction 11 such that $V(x)=V_r(x)+V_i(x)$. At any given frequency, the real and imaginary components of the complex velocity, $V_r$ and $V_i$, can be realized by driving two piezoelectric elements 19,21, 23,25 (one real and one imaginary) of the surface, say at $x_0$, with signals that are 90° out of phase. Further, a positive or negative Vr is implemented (at R+ piezoelectric elements 19 and R− piezoelectric elements 21 respectively) by driving at phase 0° or 180° and a positive or negative Vi is implemented by driving at 90° or 270° (at I+ piezoelectric elements 25 and I− piezoelectric elements 23 respectively).

As discussed above, the result is that any slice 4 of the surface (say at offset $x_0$, as shown in FIG. 2) along the frequency steered direction 11 can be driven with a complex voltage $V_r(x_0)+V_i(x_0)$ by doing the following. First, define a single separation distance 37 between each corresponding piezoelectric element 19,21,25, and 23 as discussed above to generate a constant spacing between the piezoelectric elements 19,21,25, and 23 arranged in alternating fashion as illustrated in FIG. 2. Next, move slice 4 along primary frequency row 15 altering the extent of the portion of each repeating real piezoelectric element 19,21 intersecting slice 4 such that such portions are proportional to $V_r(x_0)$ and connect each similar real piezoelectric element 19,21 to the appropriate voltage source (0 to 180° phase if $V_r$ has a + or − sign). Next, do the same for each repeating imaginary piezoelectric element 25,23 altering the extent of the portion of each repeating imaginary piezoelectric element 25,23 intersecting slice 4 such that such portions are proportional to $V_i(x_0)$ and connect each similar imaginary piezoelectric element 25,23 to the appropriate voltage source (90 or 270° phase if $V_i$ has a + or − sign). As the offset, x, changes, the portion of each repeating piezoelectric element 19,21,23,25 intersecting slice 4 changes, due to the change in complex velocity along the frequency steering direction 11, giving rise to the pattern in FIG. 2.

The same process described above is repeated for the second primary frequency, $f_2$, and direction theta. In a preferred embodiment, F is chosen to be approximately 260 kHz. $F_1$ and $f_2$ are typically chosen to be approximately F±20 kHz or 240 kHz and 280 kHz respectively. This results in a difference frequency of 40 kHz. However, the present invention is drawn broadly to include any F,$f_1$, and $f_2$ sufficient to operate in a desired parametric mode.

The filigree array of the present invention requires only N independent control points in the delay steered direction and four phase-delayed copies (0, 90, 180, 270 degrees) of each primary frequency signal for each primary frequency row 15,17. As there are two primary frequency rows 15,17, the result is 8N control points for a single coupled frequency pair 41. While there are a plurality of coupled frequency pairs 41 stacked in delayed steered direction each with a means for receiving time delayed copies of the two primary frequency signals, such delays can be implemented as described above using conventional and cost effective time delay circuitry and apparatus.

Use of the parametric mode sound generation simultaneously achieves low frequency performance and high directionality using relatively small size apertures. In many applications low frequency is of interest because of low attenuation, and other target characteristics. Conventional (linear mode) low frequency sources require very large radiating apertures to form directional acoustic beams.

In summary, this invention provides the capability to form highly directional (<5 degrees) acoustic beams that remain relatively constant over a broad range of frequency (~2 octaves) using relatively small radiating apertures (~6 to 12 inches).

Several underwater sonar applications exist for steered directional acoustic beams including, but not limited to, mine detection, acoustic communication (ACOMMS), and surface scanning. In the present disclosed approach, the number of active control elements needed to form a steered directional acoustic beam is much lower than that required to conventional broadband time-delay beam forming. Therefore this invention simplifies electronics.

It is apparent that there has been provided in accordance with the present invention a transducer for steering parametric acoustic beams which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A piezoelectric embedded monolithic active surface for transmitting a directed acoustic beam comprising:

a monolithic active surface;

a plurality of piezoelectric elements embedded on said surface forming an array comprising:

a plurality of coupled frequency pairs comprising:

a first primary frequency row extending in a frequency steered direction said first primary frequency row comprising means for accepting a first primary frequency signal; and a second primary frequency row extending in said frequency steered direction and located adjacent to said first primary frequency row said second primary frequency row comprising means for accepting a second primary frequency signal;

wherein said plurality of coupled frequency pairs repeat in a delay-steered direction and wherein each of said coupled frequency pairs comprises a means for accepting a time delayed copy of said first and second primary frequency signals.

2. The piezoelectric embedded monolithic active surface of claim 1, wherein said first primary frequency row comprises: a real frequency row comprising a plurality of $R^+$ piezoelectric elements and a plurality of $R^-$ piezoelectric elements arranged in alternating fashion in said frequency steered direction; and an imaginary frequency row comprising a plurality of $I^+$ piezoelectric elements and a plurality of $I^-$ piezoelectric elements arranged in alternating fashion in said frequency steered direction.

3. The piezoelectric embedded monolithic active surface of claim 2, wherein said plurality of $R^+$ piezoelectric elements comprise means for receiving said first primary frequency signal; wherein said plurality of $R^-$ piezoelectric elements comprise means for receiving a first primary frequency 180° shifted signal; wherein said plurality of $I^-$ piezoelectric elements comprise a means for receiving a first primary frequency 270° shifted signal; and wherein said plurality of $I^+$ piezoelectric elements comprise a means for receiving a first primary frequency 90° shifted signal.

4. The piezoelectric embedded monolithic active surface of claim 1, wherein said second primary frequency row comprises:

a real frequency row comprising a plurality of $R^+$ piezoelectric elements and a plurality of $R^-$ piezoelectric elements arranged in alternating fashion in said frequency steered direction; and an imaginary frequency row comprising a plurality of $I^-$ piezoelectric elements and a plurality of $I^-$ piezoelectric elements arranged in alternating fashion in said frequency steered direction.

5. The piezoelectric embedded monolithic active surface of claim 4, wherein said plurality of $R^+$ piezoelectric elements comprise means for receiving said second primary frequency signal; wherein said plurality of $R^-$ piezoelectric elements comprise means for receiving a second primary frequency 180° shifted signal; wherein said plurality of $I^-$ piezoelectric elements comprise a means for receiving a second primary frequency 270° shifted signal; and wherein said plurality of $I^+$ piezoelectric elements comprise a means for receiving a second primary frequency 90° shifted signal.

6. The piezoelectric embedded monolithic active surface of claim 3 wherein each of said plurality of coupled frequency pairs comprise a means for accepting a time delayed copy of said first primary frequency 180° shifted signal, said first primary frequency 270° shifted signal, and said first primary frequency 90° shifted signal.

7. The piezoelectric embedded monolithic active surface of claim 3 wherein each of said plurality of coupled frequency pairs further comprise a means for accepting a time delayed copy of said second primary frequency 180° shifted signal, said second primary frequency 270° shifted signal, and said second primary frequency 90° shifted signal.

8. The piezoelectric embedded monolithic active surface of claim 1 wherein said time delayed copy of said first and second primary frequency signals is performed by an apparatus selected from the group consisting of analog delay lines, digital delay lines, and Charge Coupled Delay-lines.

9. The piezoelectric embedded monolithic active surface of claim 1 wherein said monolithic active surface is comprised of a substance selected from the group consisting of 1–3 piezoelectric composite material and Polyvinylidene Fluoride (PVDF) sheets.

* * * * *